L. M. GARDINER.
TRANSMISSION GEARING.
APPLICATION FILED NOV. 4, 1918.

1,349,719.

Patented Aug. 17, 1920.

Witnesses
E. R. Ruppert

Inventor
Lou M. Gardiner

By Victor J. Evans
Attorney

UNITED STATES PATENT OFFICE.

LOU M. GARDINER, OF SAN FRANCISCO, CALIFORNIA, ASSIGNOR TO THE IRON HORSE TRACTOR COMPANY, A CORPORATION OF DELAWARE.

TRANSMISSION-GEARING.

1,349,719. Specification of Letters Patent. Patented Aug. 17, 1920.

Application filed November 4, 1918. Serial No. 261,013.

*To all whom it may concern:*

Be it known that I, LOU M. GARDINER, a citizen of the United States, residing at San Francisco, in the county of San Francisco and State of California, have invented new and useful Improvements in Transmission-Gearing, of which the following is a specification.

This invention relates to transmission gearing of the changeable speed and reversible type, said transmission gearing being adapted to be used in conjunction with motor vehicles in general, and in other connections which will suggest themselves to the manufacturer.

The chief object of the present invention is to greatly simplify and improve transmission gearing of the character above referred to, at the same time reducing the number of parts, bearings and friction incident thereto, and produce a transmission gearing in which the shift from one speed to another, and from forward to reverse may be effected easily and with a minimum exertion on the part of the operator.

With the above and other objects in view, the invention consists in the novel construction, combination and arrangement herein fully described, illustrated and claimed.

Figure 1:
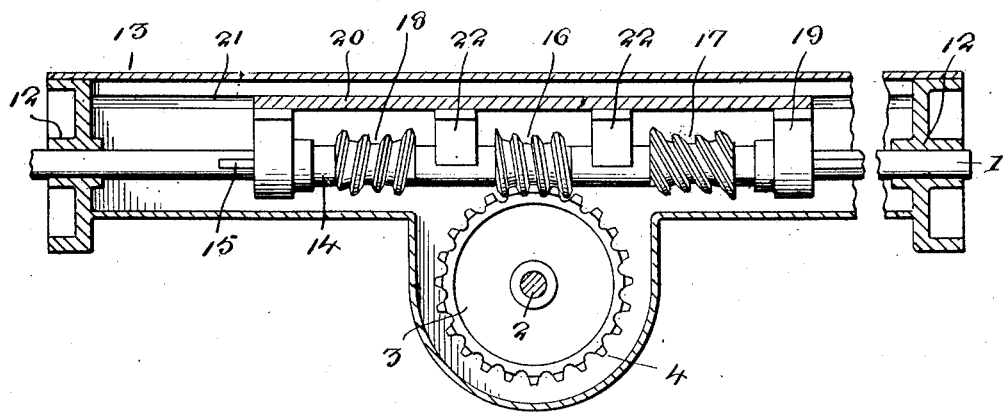
Figure 1 is a vertical longitudinal section through the transmission gearing.
Figure 2:
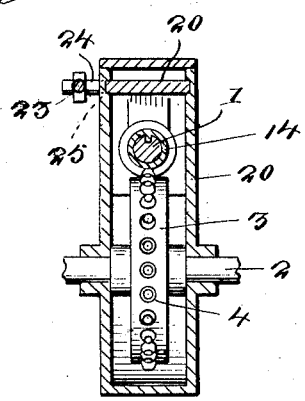
Fig. 2 is a vertical transverse section taken in line with the driven shaft.
Figure 3:
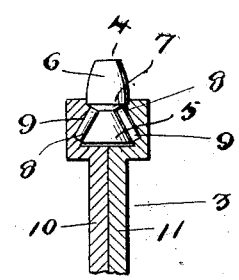
Fig. 3 is a fragmentary section showing the construction of the driven gear and the manner of mounting the teeth of said gear.

Referring to the drawings, 1 designates the driving shaft of the transmission gearing, and 2 the driven shaft. As shown in the drawings, the shafts 1 and 2 are at a right angle to each other and located in different planes, as clearly shown in Fig. 1. Mounted fast upon the driven shaft 2 is a driven gear 3, having teeth 4, which are freely rotatable in relation to the body of the gear. Each tooth 4 comprises a frusto-conical base portion 5 and a conico-cylindrical portion 6, the latter projecting beyond the periphery of the body of the wheel. Each tooth is also formed with an external annular race or groove 7, to receive an annular series of anti-friction rollers 8, which are contained between the respective tooth and the adjacent body of the wheel, the latter being formed with a race or groove 9 opposite the race 7, to receive the rollers 8 and to retain the same in place. In order to assemble the teeth 4 in relation to the body of the wheel, the latter is made of sectional formation, as shown in Fig. 3, comprising the oppositely located body portions 10 and 11, which may be secured together by any suitable fastening means.

The driving shaft 1 is mounted in bearings 12 in a tubular housing 13, so as to exclude dust, dirt, and other foreign matter, and enable lubricating matter to be maintained therein for the purpose of lubricating the working faces of the driving and driven gears. Surrounding the shaft 1 and actuated thereby, is a gear sleeve 14, which is shown as connected to the shaft 1 by a spline or feather 15, permitting said sleeve to be slid longitudinally along the sleeve 1 while constantly rotating therewith and actuated thereby. The sleeve 14 comprises a plurality of gear faces 16, 17 and 18, shown as consisting of worms. The gear faces 16 and 17 are pitched in the same direction, the pitch of the gear face 17 being greater than the pitch of the gear face 16. The gear face 16 produces a certain ratio of speed between the driving and driven shafts, while the gear face 17 produces a greater ratio of speed or otherwise drives the shaft 2 at a relatively greater speed than that produced by the gear face 16. The gear face 16 is therefore employed for what is known as low speed, while the gear face 17 is utilized for higher speed. The gear face 18 is pitched in the reverse direction and when thrown into mesh with the gear 3 produces a reverse rotation of the driven shaft 2. The gear sleeve 14 is journaled adjacent to the opposite ends thereof in bearings 19 attached fixedly to a slidable carrier 20, which is movable in guide-ways 21 within the housing 13. The carrier 20 is also shown as provided with half bearings 22, which overlie and bear against the gear sleeve 14. The carrier 20 is shifted longitudinally of the shaft 1 by any suitable shifting means, such as a rod 23 attached to a projection or pin 24, extending laterally from the carrier 20 and working in a longitudinal slot 25 in the housing 20.

From the foregoing description taken in connection with the accompanying drawings, it will now be seen that the transmission mechanism above described provides for changing the ratio of speed between the driving shaft and the driven shaft, and also provides for reversing the direction of rotation of the driven shaft. The change from one speed to another and reverse is effected by imparting a slight movement to the carrier 20, and consequently the gear sleeve 14 is for the purpose of shifting any one of the gear faces 16, 17 and 18 into mesh with the driven gear 3. This is rendered particularly easy and practical by simultaneously rotating the sleeve 14 while shifting the same longitudinally, said operation being facilitated by reason of the fact that the teeth 4 of the driven gear 3 are freely rotatable in relation to the body of the driven gear. In this connection it will be understood that the shaft 1, in motor vehicle practice, is driven by the engine whether running at high or low speed, and therefore the gear sleeve 14 is also consistently rotated. As the gear sleeve 14 is shifted longitudinally to change from one speed to another the gear faces 16, 17 and 18 easily work their way into full meshing position with the rotatable teeth 4 of the driven gear.

The transmission mechanism above described enables the usual clutch to be dispensed with.

Having described the invention, what is claimed is:

The combination of a driving shaft, a driven shaft, a worm gear on said driving shaft, and a driven gear on said driven shaft, the driven gear embodying two separable disk like sections having frusto-conical bearing sockets in the meeting faces thereof, rotatable gear teeth having frusto-conical base portions working in said sockets, and a conical series of anti-friction rollers surrounding the base portion of each tooth within the respective bearing socket.

In testimony whereof I affix my signature.

LOU M. GARDINER.